United States Patent
Hills et al.

(10) Patent No.: US 7,418,714 B2
(45) Date of Patent: Aug. 26, 2008

(54) EMPLOYING THREE PARAMETER BUFFER ACCESS IN CONNECTION WITH SMBUS NOTIFICATIONS

(75) Inventors: Michael P. Hills, Lynnwood, WA (US); Michael H. Tsang, Bellevue, WA (US); Tony Pierce, Bellevue, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 10/083,098

(22) Filed: Feb. 26, 2002

(65) Prior Publication Data

US 2003/0163599 A1      Aug. 28, 2003

(51) Int. Cl.
*G06F 9/46* (2006.01)
(52) U.S. Cl. .................................. 719/318; 710/100
(58) Field of Classification Search ................. 719/321, 719/322, 318, 327; 713/300, 340; 710/100
See application file for complete search history.

(56) References Cited

U.S. PATENT DOCUMENTS

| | | | |
|---|---|---|---|
| 6,131,131 A | | 10/2000 | Bassman et al. |
| 6,138,183 A * | | 10/2000 | Tien et al. ................ 710/22 |
| 6,167,511 A * | | 12/2000 | Lewis ........................ 713/2 |
| 6,185,677 B1 * | | 2/2001 | Nijhawan .................. 713/2 |
| 6,189,108 B1 | | 2/2001 | Cromer et al. |
| 6,219,742 B1 * | | 4/2001 | Stanley ..................... 710/260 |
| 6,321,341 B1 | | 11/2001 | Kamijo et al. |
| 6,460,106 B1 * | | 10/2002 | Stufflebeam .............. 710/304 |
| 6,748,461 B2 * | | 6/2004 | Oshins et al. .............. 710/8 |
| 6,792,491 B2 * | | 9/2004 | Cooper ..................... 710/260 |
| 6,907,474 B2 * | | 6/2005 | Oshins et al. ............. 719/321 |
| 7,032,116 B2 * | | 4/2006 | Cooper ..................... 713/300 |
| 2001/0020268 A1 | | 9/2001 | Kawano et al. |

OTHER PUBLICATIONS

System Management Bus (SMBus) Specification; Aug. 3, 2000; SBS Implementers Forum.
Compaq Computer Corporation, Intel Corporation, Microsoft Corporation, Phoenix Technologies Ltd, Toshiba Corporation, Advanced Configuration and Power Interface Specification Revision 2.
European Search Report dated Sep. 25, 2006 mailed Oct. 10, 2006 for European Patent Application Serial No. 03 001 300.7, 2 Pages.

(Continued)

*Primary Examiner*—Van H. Nguyen
(74) *Attorney, Agent, or Firm*—Amin, Turocy & Calvin, LLP (57) ABSTRACT

A system that facilitates access to an SMBus is provided. The system includes a notification component that identifies an SMBus event and a driver that dispatches the SMBus event to an AML event handler. A method for SMBus event handling is also provided. The method includes receiving an SMBus event notification, identifying the SMBus event notification, dispatching the SMBus event notification to an AML event handler, and handling the SMBus event notification in AML code. Two new ACPI opcodes, which are a three parameter operation region read and a three parameter operation region write can be utilized in accordance with the present invention.

23 Claims, 8 Drawing Sheets

OTHER PUBLICATIONS

Smart Battery System Implementers Forum: "SMBus Control Method Interface Specification, Version 1.0" Dec. 10, 1999, pp. 1-41, http://www.smbus.org/specs/smbus_cmi10.pdf, retreived on Sep. 6, 2006.

Smart Battery System Implementers Forum: "SMBus Device Driver External Architecture Specification, Version 1.0" Dec. 10, 1999, pp. 1-20, http://www.smbus.org/specs/smbus_driver_ext_arch10.pdf, retrieved on Sep. 7, 2006.

"Advanced Configuration and Power Interface Specification, Revision 1.0B" Advanced Configuration and Power Interface Specification, Feb. 2, 1999, pp. 1-397.

* cited by examiner

Fig. 8

EMPLOYING THREE PARAMETER BUFFER ACCESS IN CONNECTION WITH SMBUS NOTIFICATIONS

TECHNICAL FIELD

The present invention relates generally to SMBus (System Management Bus) event notification handling and relates more particularly to handling SMBus event notification in ASL (ACPI Source Language) code, which is compiled into AML (ACPI Machine Language) code and AML images—eliminating the need for the ASL code to manipulate lower level hardware, such as an embedded controller.

BACKGROUND OF THE INVENTION

The ACPI specification outlines an interface to an embedded controller. An SMBus is a System Management Bus. An SMBus is employed for access to personal computer hardware (e.g., batteries, energy efficient devices, devices likely to be managed in an Advanced Configuration Power Interface (ACPI) environment). An SMBus is conventionally accessed by an operating system via an ACPI specified embedded controller and embedded controller related device drivers. Synchronization problem(s) can occur when, for example, the operating system and the AML code desire to access the SMBus at about the same time.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention facilitates receiving SMBus event notifications without having to directly manipulate the ACPI specified embedded controller in AML code. An SMBus driver receives notification interrupts and invokes registered AML event handling code associated with_Qxx control methods. Thus, higher level AML code (e.g., based on ASL source code) can be employed to process SMBus event notifications.

As mentioned in the background section, the ACPI specification outlines an interface to an embedded controller. The embedded controller described in the ACPI specification uses a programming model similar to the programming model employed for a keyboard interface that is inefficient, utilizing an interrupt intensive approach that requires approximately one interrupt to transfer one byte. Employing improved operation region access methods simplifies access to SMBus event notifications, improves efficiency in such event handling and reduces synchronization problem(s). Such improved access and related efficiencies can be employed, for example, in an architecture that is designed to improve overall computer power efficiency and to eliminate startup and shutdown delays. Furthermore, such improved access and related efficiencies can be employed in an architecture where the operating system assumes the central role of coordinating power management activities and takes responsibility for defining and handling power state transitions for the system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and a computer. By way of illustration, both an application running on a server and the server can be a computer component.

Figure 1:
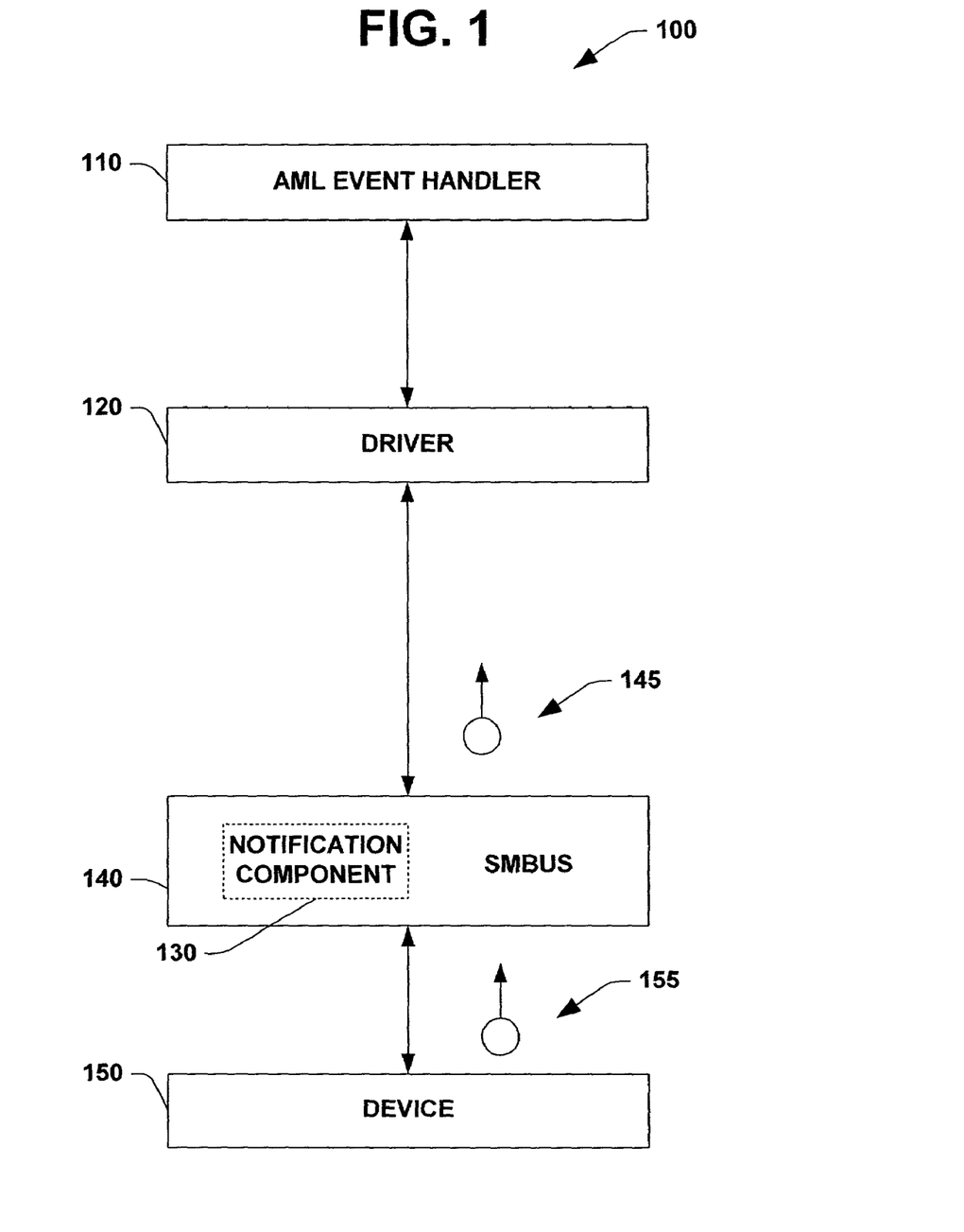
FIG. 1 is a block diagram of a system that facilitates SMBus access, in accordance with an aspect of the present invention.

FIG. 1 presents an SMBus accessing system 100 that facilitates handling SMBus event notifications directly (e.g., without employing the ACPI specified embedded controller). An SMBus is a System Management Bus. An SMBus is employed for access to personal computer hardware (e.g., batteries, energy efficient devices, devices likely to be managed in an ACPI environment). An SMBus is conventionally accessed by an operating system via an ACPI specified embedded controller and embedded controller related device drivers. Such device drivers interface with the SMBus, and other components, through an ACPI Register Interface and through defining standard control methods that are called in the event of an embedded controller notification. Since embedded controller notifications defined as_Qxx(xx=00–ff) can only be located in the scope of the embedded controller device, the same set of control methods can be reused for the SMBus by requiring that they be located only under the SMBus device. Thus, in one environment in which the present invention can be employed, an SMBus driver can queue control methods for SMBus alarms, where the methods are placed under the SMBus device with the name_Qxx, where xx is the hex format of the SMBus address of the device sending the alarm.

ACPI is a specification that defines an interface to a system board that facilitates operating system directed power management, resource management and system configuration. ACPI defines a standard way for a system board to describe its device configuration and power control hardware interface to an operating system. ACPI provides "control methods" that facilitate manipulating hardware in an ACPI system via a standard register interface. Some of the control methods (e.g., the_Qxx control methods) can be employed to facilitate receiving SMBus event notifications and invoking method handling code. In an ACPI environment, a system board designer implements required register interfaces and provides information about devices and their control mechanisms, where such information is stored in description tables.

To enhance the functionality of an ACPI device, the vendor can supply a function driver, which communicates with the ACPI BIOS through an operation region supplied by the driver. The ACPI driver accesses the operation region by calling an operation region handler supplied by the function driver. An operation region is a data object that can be divided into fields of various sizes that can be treated like other AML data objects and which facilitates communications with hardware (e.g., SMBus, SMBus controller).

By communicating through ACPI operation regions, AML code in the BIOS can invoke device-specific operations that depend on the configuration of the driver and the host system. Conventionally, the BIOS accesses data (a read or a write) in a device's operation region. Thereafter, to access the operation region, the ACPI driver calls the function driver's operation region handler and the operation region handler does whatever action is programmed for the access and returns information associated with the access. ACPI did not specify three parameter operation region reads and/or writes.

Some goals of ACPI are battery power management, longer battery life and reduced heat generation. Thus, ACPI is commonly employed in OSPM environments. OSPM is Operating System Power Management. OSPM concerns controlling device power management at the operating system level. The operating system uses ACPI AML (ACPI Machine Language) code stored in ACPI BIOS (Basic Input Output System) to identify devices that are present in a system and to facilitate loading appropriate device drivers for the identified devices. ASL is the ACPI Source Language. ASL is compiled into AML code and AML images. AML is the ACPI Machine Language. AML is stored in ACPI BIOS RAM (Random Access Memory). AML is a pseudocode assembly language that is interpreted by an AML interpreter. An AML interpreter parses and executes AML byte code. The AML interpreter evaluates namespace objects and executes AML control methods. A control method is one type of namespace object, much like a function in some other programming language, that contains one or more AML instructions to be executed, and can accept input parameter(s) and returns a result. A namespace object can be a wide variety of entities, from a single value (like a variable), a package of data (like a data structure), to an operation region field, or control method. The device drivers use control methods (e.g., _Qxx control methods) in the ACPI AML code to access device hardware and to facilitate power management. Such drivers can be, for example, WDM (Windows driver model, provides common architecture for I/O services) drivers.

ACPI defined a hardware and software interface between an operating system and an SMBus controller via an ACPI specified embedded controller. The ACPI specification outlines an interface to an embedded controller. The embedded controller described in the ACPI specification is, in some cases, programmed in a manner similar to programming a keyboard interface, which can be inefficient. The ACPI specified embedded controller is interrupt intensive and slow, utilizing approximately one interrupt to transfer a single byte. With improved operation region access methods, a performance increase results when the SMBus access is performed by a device driver that is running in native machine code rather than in interpreted AML. An additional benefit of the system and method of the present invention is that AML code typically must be written many times by many OEMs for each BIOS, whereas a driver is generally more universal.

An embedded controller is a general class of microcontrollers used to support OEM (Original Equipment Manufacturer) specific implementations (e.g., in mobile environments where battery life and/or power consumption are concerns). An embedded controller performs complex low-level functions through an interface to a host microprocessor. ACPI defines a standard hardware and software communication interface between an operating system driver and an embedded controller (e.g., for a smart battery). The present invention facilitates interfacing AML code to a driver, so that the details of accessing the SMBus controller and synchronization can be performed by the driver rather than by AML code.

The system 100 includes an SMBus 140 having a notification component 130 that identifies an event 145 (e.g., generated by the SMBus 140). The event 145 can be generated by the notification component 130 in response to a device event 155 generated by a device 150. For example, a battery may send an alert signal to the SMBus 140. The notification component 130 can then generate the event 145. Generating the event can include queuing a_Qxx control method. The notification component 130 is a computer component, as that term is defined herein. Thus, the notification component 130 can analyze the event 155 by techniques including, but not limited to, conditional branching techniques, interrupt vector table techniques, pattern matching techniques and the like.

The notification component 130 identifies the event 155 and interfaces with a driver 120. While interfacing with the driver 120, the notification component 130 may forward status and/or data with a driver call 145 to the driver 120. The status may be associated with the SMBus segment and may identify, for example, the device that generated the event and the type of event. The data may also be associated with the SMBus event and may provide information concerning the event (e.g., time, device, type of event). The driver 120 receives the driver call 145 and dispatches the SMBus event to an AML event handler 110.

Figure 2:
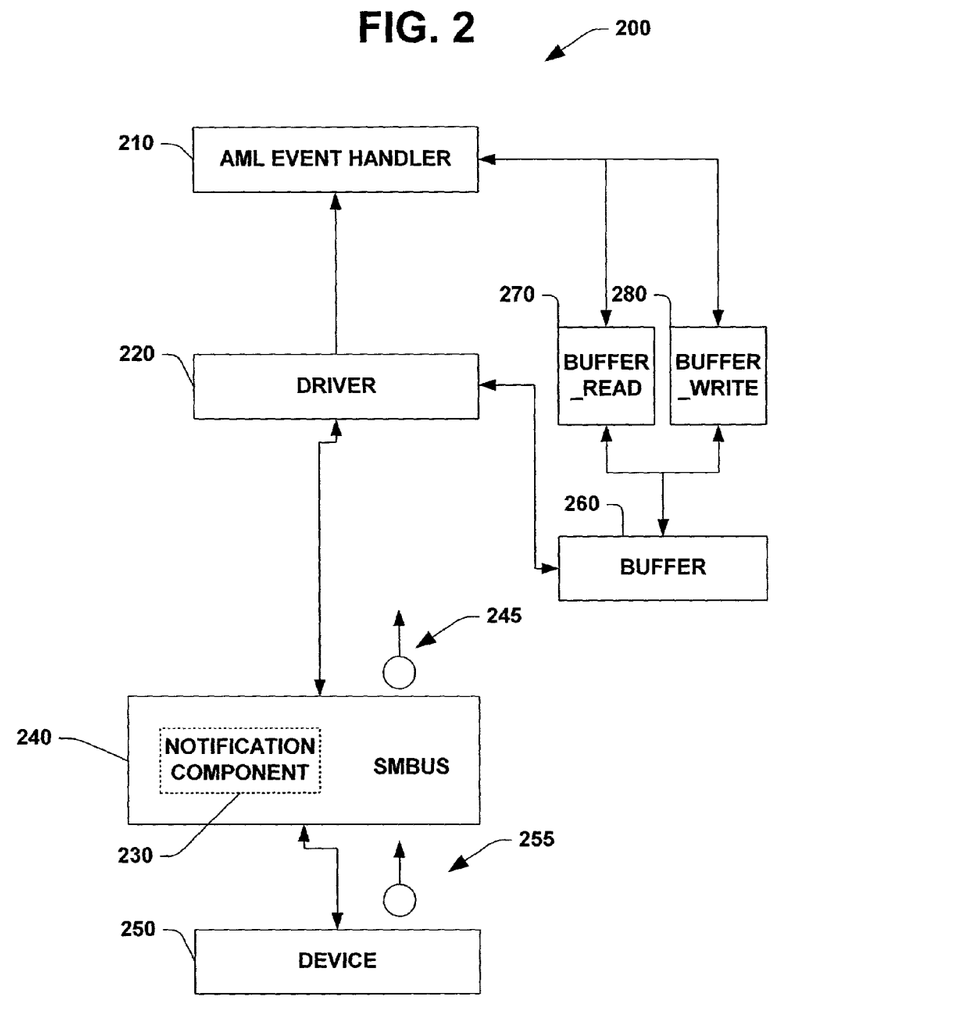
FIG. 2 is a block diagram of a system that facilitates SMBus access, and which employs three parameter reads and writes, in accordance with an aspect of the present invention.

Turning now to FIG. 2, an SMBus event handling system 200 that employs a three parameter buffer read method 270 and/or a three parameter buffer write method 280 to access a buffer 260 associated with an SMBus 240 is illustrated. The system 200, like the system 100, includes An SMBus 240 having a notification component 230 that dispatches an SMBus event 245 associated with a device 250 to a driver 220 that invokes AML event handling code 210.

The event handling tasks performed by the AML event handler 210 are simplified and made more efficient through the use of the three parameter read 270 and/or three parameter write 280. These three parameter methods access a buffer 260 (e.g., an operation region), to transfer status and various sized blocks of data. An operation region is a data object that can be divided into fields of various sizes that can be treated like other AML data objects and which facilitates communications with hardware (e.g., SMBus, memory, or Input/Output (I/O) ports). The type of operation region needed to access the SMBus is a BufferAcc operation region. The BufferAcc access type was defined by ACPI because the interface to the SMBus is more complicated than the interface for other resources for which operation regions are used (e.g., memory and I/O ports). BufferAcc operation regions were designed to transfer the entire buffer bi-directionally between the AML environment and the operation region handler in the function driver for both read and write operations. However, normal AML opcodes such as "Store" are only designed to pass data in one direction to or from an operation region. By employing the present invention, a BufferAcc operation region can be read via a three parameter Buffer_Acc_Read method and can be written by a three parameter Buffer_Acc_Write method, where the first parameter is the initial contents of the buffer before being passed to the operation region handler, the second parameter is a reference to the operation region handler field being accessed, and the third parameter is a buffer to receive the buffer returned by the operation region handler. Reads and writes to a BufferAcc operation region associated with an SMBus can trigger calls to an SMBus driver (e.g., driver 220).

One example of a three parameter buffer read 270 includes a first parameter that holds initial data that is employed by a computer component that accesses an operation region associated with the SMBus. Such initial data can control, for example, how the operation region is read, when it is read, the order in which it is read, and the like. Another example of a three parameter buffer read 270 includes a second parameter that is a reference to the operation region associated with the SMBus from which the data is to be read. Such a reference can be, for example, a numerical identifier that identifies a predefined operation region or a range of addresses that define an operation region. Another example of a three parameter buffer read 270 includes a third parameter that holds the data read from the operation region and/or which holds a reference to a memory location(s) where the data that was read was placed.

The three parameter read 270 can be made from the AML event handler 210. Thus, an SMBus event handler can be written at a higher level, simplifying SMBus event notification handling.

One example of a three parameter buffer write method 280 includes a first parameter that is the data to be written to an operation region associated with an SMBus or is a reference to a location where the data to be written is stored. Another example of the three parameter buffer write method 280 includes a second parameter that is a reference to the operation region to which the data is to be written. The reference identifies the operation region and can be, for example, an index into an operation region address table, an address and/or a range of addresses. Another example of the three parameter buffer write method 280 includes a third parameter that is a status code returned by the computer component that wrote the data to the operation region. Such status code may indicate, for example, the success or failure of the write and/or the amount of data written. The example three parameter buffer write methods 280 facilitate the AML event handler 210 accessing the SMBus via the buffer 260. The higher level ASL methods simplify writing SMBus event handling code. Furthermore, by facilitating writing variable length data blocks directly to an operation region associated with the SMBus 240, the three parameter write method 280 facilitates reducing the number of interrupts associated with SMBus data transfers and reducing the number of components involved in such transfers. Thus, efficiency improvements are achieved.

Figure 3:
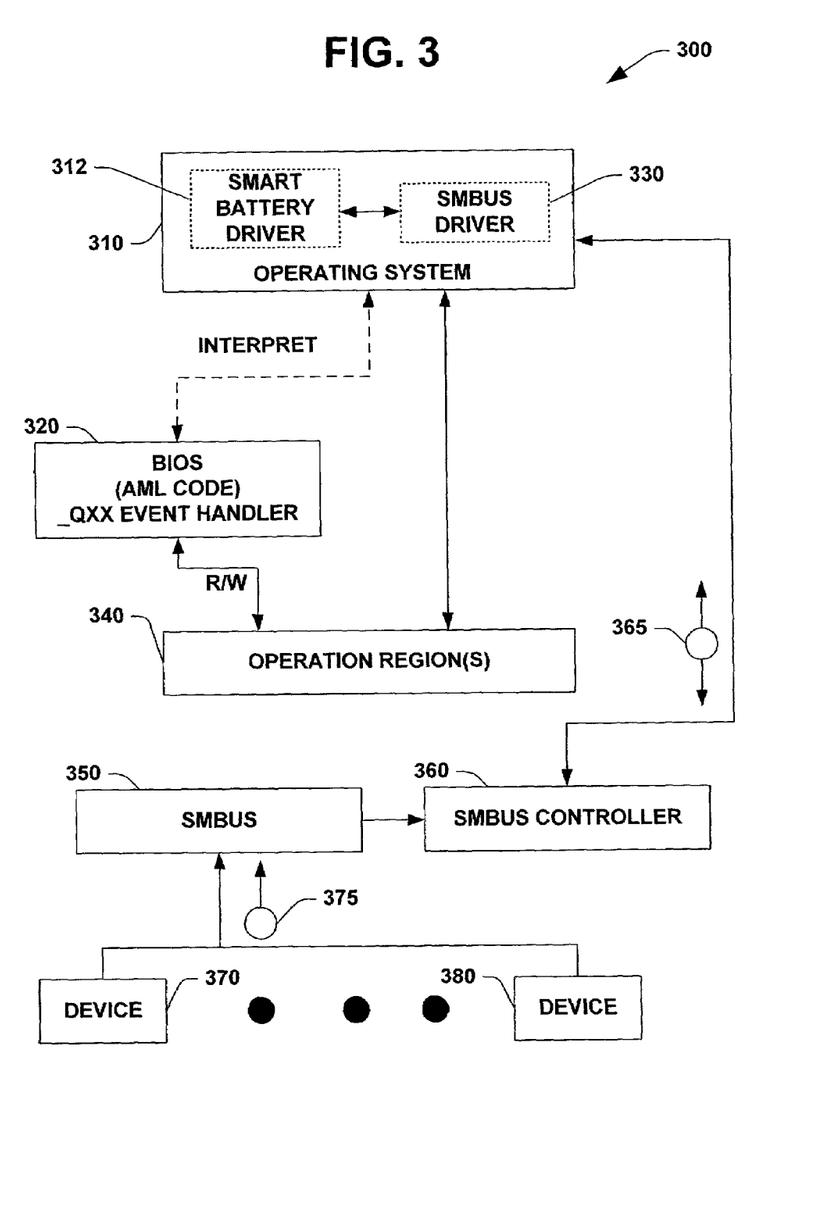
FIG. 3 is a block diagram of a system that facilitates handling SMBus event notifications, in accordance with an aspect of the present invention.

Turning now to FIG. 3, a system 300 that facilitates SMBus event handling is illustrated. The system 300 facilitates an operating system 310 engaged in OSPM and/or a smart battery driver 312 to interact with an SMBus driver 330 that will dispatch SMBus events to an AML event handler whose entry point is stored in AML code in a BIOS 320. The SMBus driver 330 can receive a notification from an SMBus controller 360 and then communicate with the SMBus controller 360 via one or more operation region(s) 340. The SMBus driver 330 can also interact with AML code stored in the BIOS 320. The AML code can store, for example, the entry point for an ASL code event handler. The entry point can be accessed, in one example of the present invention, through_Qxx control methods, which control methods are well known in the art of processing embedded control interrupts. The AML code in the BIOS 320, and/or AML event handling code can make read and write calls R/W to the operation region(s) 340. When the operation region to which the read or write R/W is made is associated with the SMBus controller 360 and/or the SMBus 350, then a call to the SMBus driver 330 can be triggered.

Thus, in FIG. 3, devices (e.g., device 370 through device 380) may experience conditions of interest to the SMBus 350. Therefore, the devices may generate an alert, notification, event, interrupt, edge, trigger or other signal 375 that is received and interpreted by the SMBus 350 and/or SMBus controller 360. The SMBus 350 generates an event notification 365 that conventionally was processed by an embedded controller and handled by AML code. By employing the present invention, the event notification 365 can be processed by the AML code_Qxx dispatching control method which dispatches the event to an AML event handler. By accessing the SMBus through operation regions (e.g., employing the three parameter access methods described in association with FIG. 2) and receiving notification via_Qxx methods rather than directly accessing the SMBus through the embedded controller with AML code, ASL code is simplified, and access to the SMBus from the smart battery driver and from ASL code is synchronized.

Figure 4:
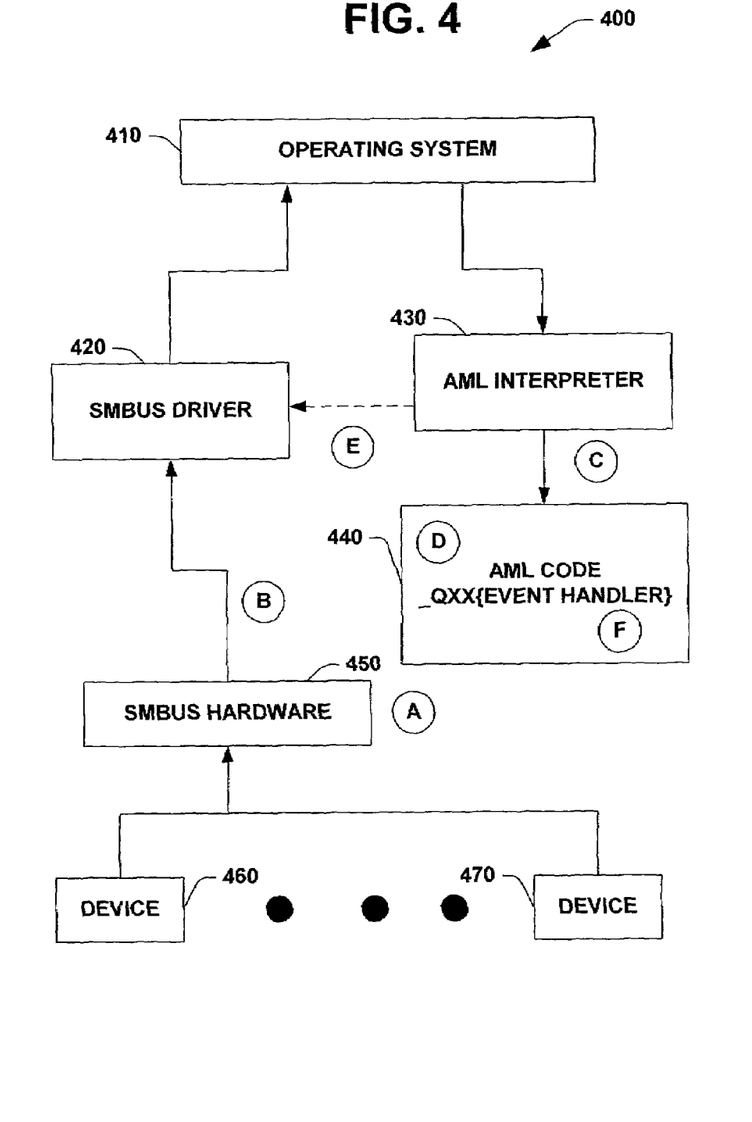
FIG. 4 is a flow diagram illustrating a control flow in a system that facilitates handling SMBus event notifications, in accordance with an aspect of the present invention.

FIG. 4 illustrates an example process flow 400 associated with SMBus event handling facilitated by the present invention. Devices, (e.g., device 460 through device 470) may generate an alert, notification, event, interrupt, edge, trigger or other signal that is received and interpreted by SMBus hardware 450. Thus, at A, the SMBus hardware 450 can generate an event notification. At B, an SMBus driver 420 identifies the event notification and may additionally read data and/or status associated with the event notification. The SMBus driver 420 initiates a call to a_Qxx method 440 previously registered, via an operating system 410, to handle the relevant notification type.

At C, an AML interpreter 430 begins interpreting the_Qxx method 440, which includes ascertaining an entry point or call to an AML event handler. At D, the event handler employs three parameter BufferAcc access methods (e.g., Buffer_Acc_Read, Buffer_Acc_Write) to access an operation region associated with the SMBus. At E, the AML interpreter 430 detects the reads and/or writes accessing the operation region associated with the SMBus, which triggers calls to the SMBus driver 420. At F, data from the SMBus hardware 450 is passed, via the operation region(s) associated with the SMBus hardware 450, to the AML event handler. This example process flow 400 illustrates the simplification in SMBus event handling achieved by the system and method of the present invention.

Figure 5:
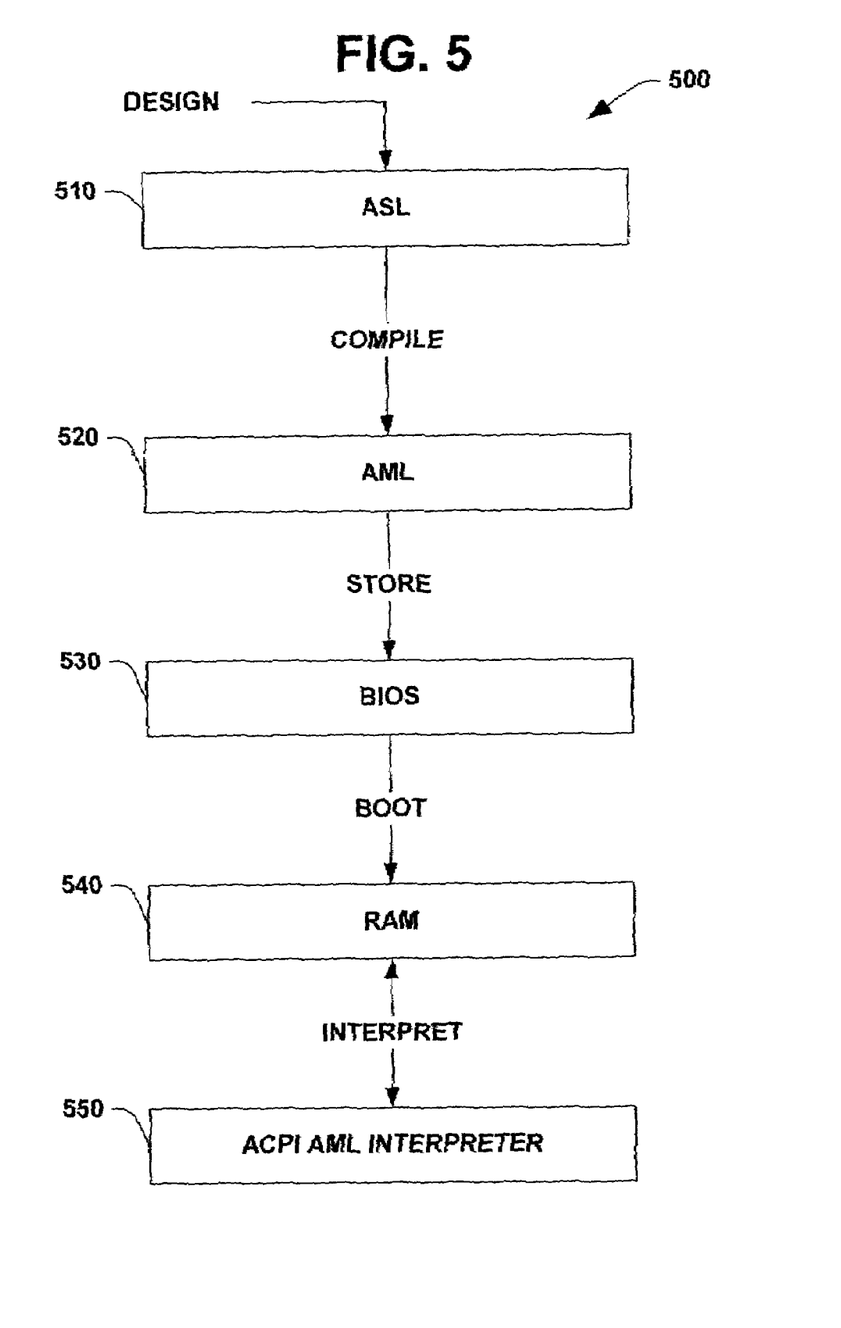
FIG. 5 illustrates a production cycle for implementing AML event handling code as simplified by an aspect of the present invention.

FIG. 5 illustrates a design process 500 that can be employed by programmers who write to take advantage of the present invention in an ACPI environment. A designer would first design an event handler and write the handler in ASL code 510. The ASL code 510 is then compiled into AML code 520 that is stored in a BIOS 530. When the system that incorporates the BIOS is booted, the AML code 520 is retrieved from the BIOS 530 and stored in a RAM 540. An AML interpreter 550 is then employed to interpret the AML code 520 stored in the RAM 540. It is to be appreciated that FIG. 5 illustrates one possible design and implementation process, and that other such processes may be employed with the present invention.

Figure 6:
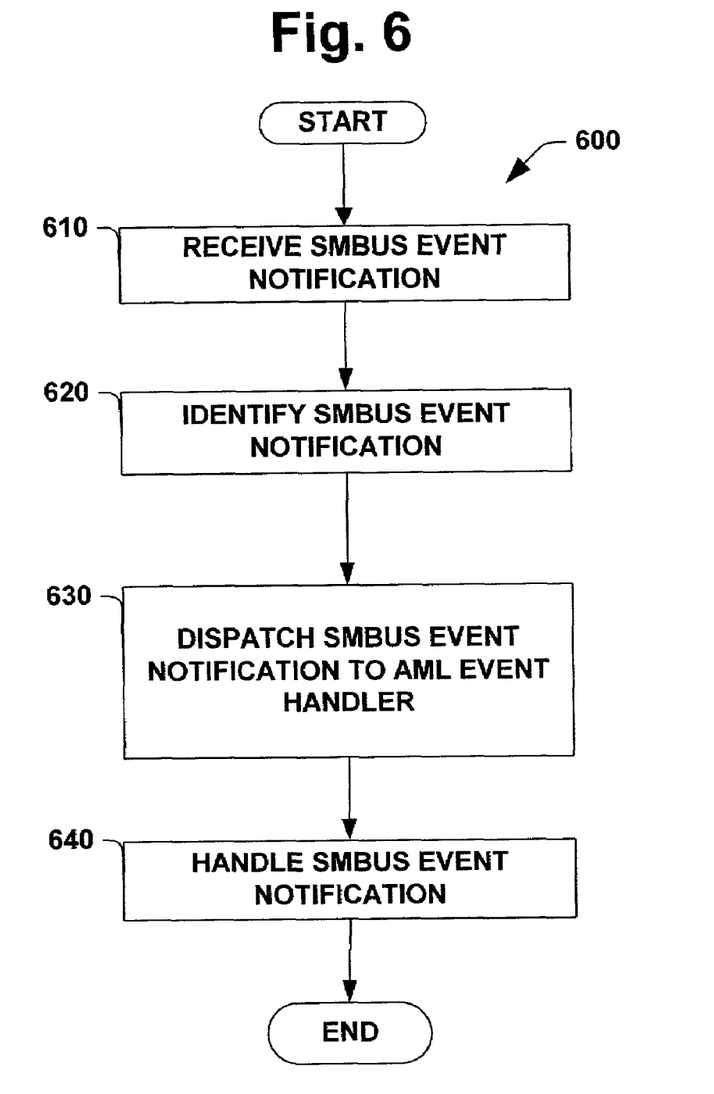
FIG. 6 is a flow chart illustrating a method for processing SMBus event notifications, in accordance with an aspect of the present invention.
Figure 7:
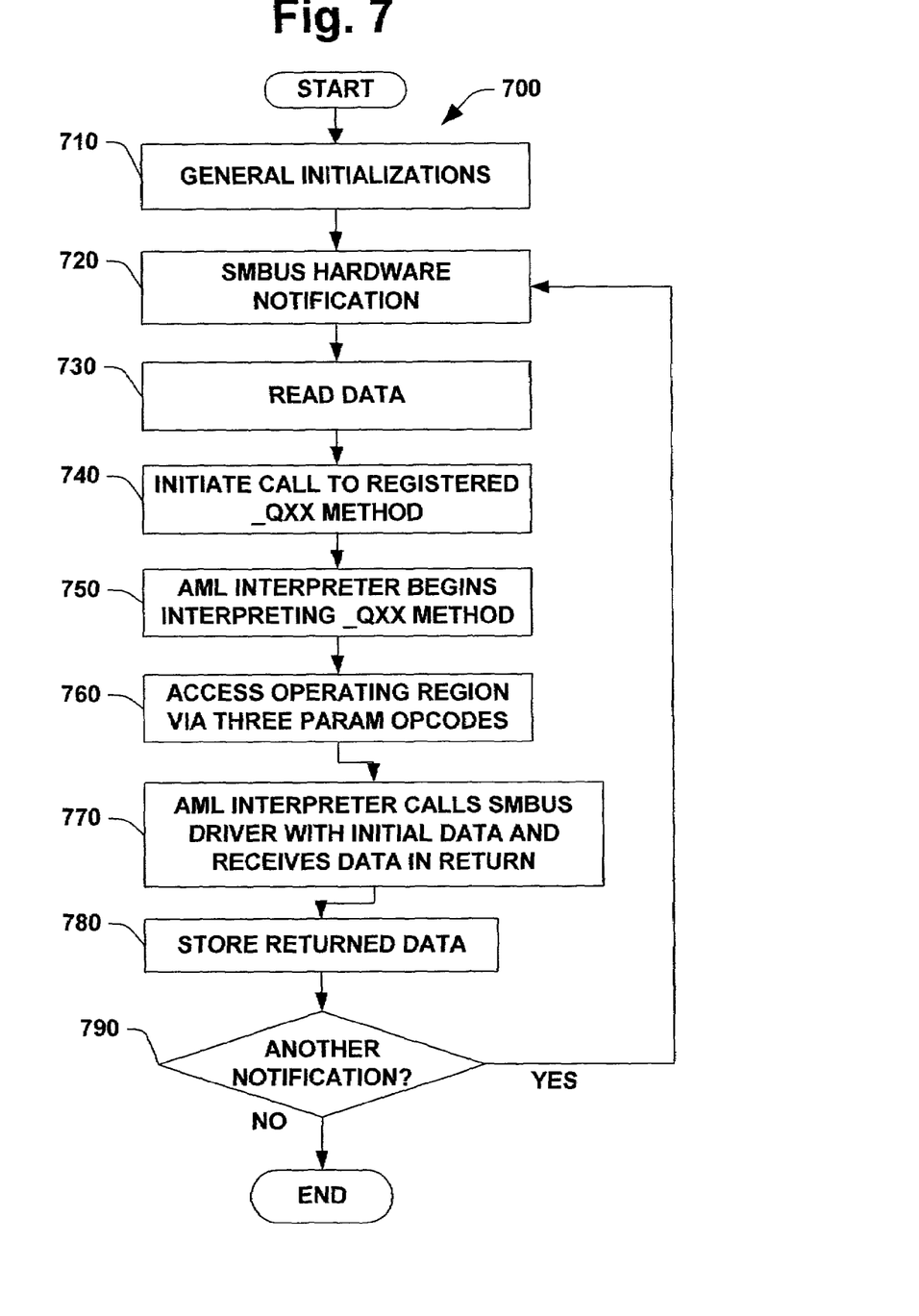
FIG. 7 is a flow chart illustrating a method for processing SMBus event notifications, in accordance with an aspect of the present invention.

In view of the exemplary systems shown and described above, methodologies that may be implemented in accordance with the present invention will be better appreciated with reference to the flow charts of FIGS. 6 and 7. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention.

The invention can be described in the general context of computer-executable instructions, such as program modules, executed by one or more components. Generally, program modules include routines, programs, objects, data structures, etc. that perform particular tasks or implement particular data types. Typically the functionality of the program modules can be combined or distributed as desired in various embodiments. Thus, computer executable instructions operable to perform the methods described herein can be stored on computer readable media including, but not limited to, disks, memories, and carrier waves. Similarly, computer executable components of the systems described herein can be stored on computer readable media including, but not limited to, disks, memories, and carrier waves.

FIG. 6 illustrates a method 600 for direct SMBus event handling. At 610, the method receives an SMBus event notification. Such notification may have been generated in response to a device alerting the SMBus to a condition (e.g., low battery power, overheating component). At 620, the method 600 identifies the SMBus event notification. For example, an SMBus may receive notifications from three different devices (e.g., battery, drive, display). Each device may be programmed to generate two different signals (e.g., power on, power off). Thus, the SMBus event notification identification at 620 may be programmed to distinguish between the three possible devices and/or the six possible event types. While three devices and two signals are described, it is to be appreciated that a greater and/or lesser number of devices, signals and event notifications can be processed by the method 600. At 630, the method 600 dispatches the SMBus event notification to an AML event handler. By way of illustration and not limitation, the method 600 may examine an operating system data structure and compute a starting address for an event handler that has registered to handle the type of SMBus event notification that was identified at 620. For example, in an OSPM environment, a disk device driver may have registered two entry points for handling disk power events (e.g., power on, power off). Thus, at 630, the SMBus event will be dispatched to the appropriate disk power event entry point. At 640, the AML event handler will handle the SMBus event notification. The method 600 can employ the three parameter buffer access routines described herein so that it does not have to directly manipulate the embedded controller registers to access the SMBus, and thus the AML code is simplified, and does not risk interfering with OS access to these registers.

FIG. 7 illustrates a method 700 for accessing an SMBus and processing SMBus event notifications. At 710, general initializations occur. Such initializations include, but are not limited to, allocating memory, establishing pointers, establishing data communications, acquiring resources, instantiating objects, and setting initial values for variables. At 720, an SMBus hardware notification is received. For example, an interrupt line may receive an edge trigger indicating that an SMBus device has generated an event. At 730, the method 700 reads data associated with the SMBus hardware notification. For example, device identifying data, notification identifying data and/or status data, among other data, can be read. Such data can be read, for example, by an SMBus driver.

At 740, the method 700 initiates a call to AML code stored in a BIOS. In one example of the present invention, the entry point to an ASL code event handler is accessed through a_Qxx control method, which is indexed by data read during 730. At 750, an AML interpreter begins interpreting the method accessed through the_Qxx control method, which can cause the AML event handler whose entry point was stored in the_Qxx method to begin execution. At 760, the AML event handler can access an operation region associated with the SMBus via three parameter opcodes (e.g., Buffer_Acc_Read, Buffer_Acc—Write). Such reads and/or writes can cause, at 770, the AML interpreter to call an SMBus device driver with initial data, operation region references, data to write, references to data locations to store read data, and so on. Thus, if a read was called at 770, then at 780 data that was read can be stored in the location specified in the three parameter read.

At 790, a determination is made concerning whether the method 700 will process another notification. For example, if the event notification was a power down notification, then the method 700 may terminate. Thus, at 790, if the determination is NO, then processing can conclude, otherwise processing can return to 720.

Figure 8:
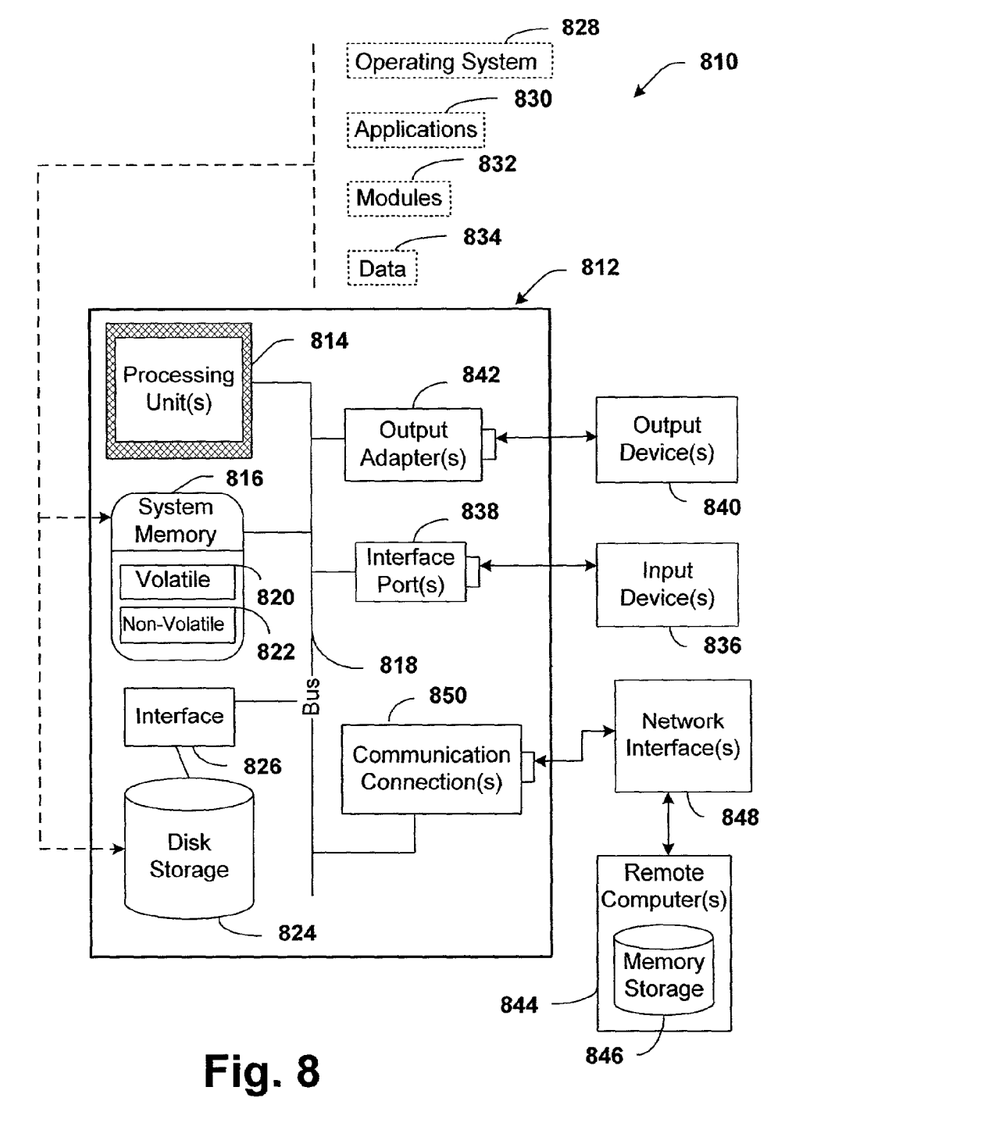
FIG. 8 illustrates an exemplary operating environment where the present invention may be employed.

In order to provide additional context for various aspects of the present invention, FIG. 8 and the following discussion are intended to provide a brief, general description of an environment 810 in which various aspects of the present invention may be implemented. While the invention is described in the general context of computer hardware and/or computer-executable instructions, such as program modules, executed by one or more computers or other devices, those skilled in the art will recognize that the invention also may be implemented in combination with other program modules and/or as a combination of hardware and software. Generally, however, program modules include routines, programs, objects, components, data structures, etc. that perform particular tasks or implement particular data types. The operating environment 810 is only one example of an environment with which the present invention can interact and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like. More particularly, the present invention can be employed in systems that employ the ACPI specification and which are performing OSPM.

With reference to FIG. 8, an exemplary environment 810 with which various aspects of the invention can interact includes a computer 812. The computer 812 includes a processing unit 814, a system memory 816, and a system bus 818. The system bus 818 couples system components including, but not limited to the system memory 816 to the processing unit 814. The processing unit 814 may be any of various available processors. Dual microprocessors and other multiprocessor architectures also can be employed as the processing unit 814. While a single internal bus interconnect architecture is shown, it is to be appreciated that other bus architectures and connection mechanisms can be employed with the present invention.

The system bus 818 can be any of several types of bus structure including the memory bus or memory controller, a peripheral bus or external bus, and/or a local bus using any variety of available bus architectures including but not limited to 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration and not limitation, nonvolatile memory 822 can be comprised of read only memory (ROM), programmable ROM (PROM), electrically programmable ROM (EPROM), electrically erasable ROM (EEPROM), or flash memory. Volatile memory 820 includes random access memory (RAM), which acts as the processor's external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer system 812 also includes removable/nonremovable, volatile/nonvolatile computer storage media. FIG. 8 illustrates, for example a disk storage 824. Disk storage 824 includes, but is not limited to, devices such as a magnetic disk drive, floppy disk drive, tape drive, Jazz drive, Zip drive, LS-100 drive, flash memory card, or memory stick. In addition, disk storage 824 can include exemplary storage media separately or in combination with other storage media including but not limited to an optical disk drive such as a compact disk ROM device (CD-ROM), CD recordable drive (CD-R Drive), CD rewriteable drive (CD-RW Drive) or a digital versatile disk ROM drive (DVD-ROM). To facilitate connection of the disk storage devices 824 to the system bus 818, a removable or non-removable interface is typically used such as interface 826. An SMBus can be employed to connect such devices and to facilitate OSPM by the operating system 828.

It is to be appreciated that FIG. 8 describes software that acts as an intermediary between users and the basic computer resources described in the operating environment 810. Such software includes the operating system 828. Operating system 828, which can be stored on disk storage 824, acts to control and allocate resources of the computer system 812. One function performed by the operating system is OSPM, which is simplified by the ASL SMBus event handling and access of the present invention. System applications 830 take advantage of the management of resources by operating system 828 through program modules 832 and program data 834 stored either in system memory 816 or on disk storage 824.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 816 through the system bus 818 via interface port(s) 838. Interface port(s) 838 include, for example, a serial port, a parallel port, a game port, and a universal serial bus (USB). Output device(s) 840 employ some of the same type of ports as input device(s) 836. Thus, for example, a USB port may be utilized to provide input to computer system 812, and to output information from computer system 812 to an output device 840. Output adapter 842 is provided to illustrate that there are some output devices 840 like monitors, speakers, and printers among other output devices 840 that may require special adapters. The output adapters 842 include, but are not limited to, video and sound cards that provide a means of connection between the output device 840 and the system bus 818. It should be noted that other devices and/or systems of devices provide both input and output capabilities such as remote computer(s) 844. Again, such devices can be connected to an SMBus and thus benefit from the SMBus event notification and access provided by the present invention.

Computer 812 can operate in a networked environment using logical connections to one or more remote computers, such as remote computer 844. The remote computer 844 may be a personal computer, a server, a router, a network PC, a workstation, a microprocessor based appliance, a peer device or other common network node, and typically includes many or all of the elements described relative to computer 812. For purposes of brevity, only a memory storage device 846 is illustrated with remote computer 844. Remote computer 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system executing one or more processors that facilitates AML (ACPI Machine Language) access to an SMBus (System Management Bus), comprising the following components:

an AML event handler component embodied on a computer readable storage medium; and, a driver component embodied on the computer readable storage medium that identifies an SMBus event and dispatches the SMBus event to the AML event handler, where the AML event handler employs at least one of a three parameter buffer access read method to read data from an operation region associated with the SMBus or a three parameter buffer access write method to write data to an operation region associated with the SMBus, where a first parameter of the three parameter buffer access read method provides an initial data to a computer component providing access to the operation region associated with the SMBus and where a second parameter of the three parameter buffer access read method is a reference to the operation region associated with the SMBus from which the data will be read.

2. The system of claim 1, where the driver receives a status and a data associated with the SMBus event from the SMBus.

3. The system of claim 1, where the driver employs a_Qxx control method to dispatch the SMBus event to the AML event handler.

4. The system of claim 3, where at least one AML event handler entry point is accessed by the_Qxx control method.

5. The system of claim 1, where a third parameter of the three parameter buffer access read method holds the data read from the operation region identified by the second parameter.

6. The system of claim 1, where a third parameter of the three parameter buffer access read method is a reference to a location to store the data read from the operation region identified by the second parameter.

7. The system of claim 1, where a first parameter of the three parameter buffer access write method is the data to be written to the operation region associated with the SMBus.

8. The system of claim 1, where a first parameter of the three parameter buffer access write method is a reference to the data to be written to the operation region associated with the SMBus.

9. The system of claim 1, where a second parameter of the three parameter buffer access write method is a reference to the operation region associated with the SMBus to which the data will be written.

10. The system of claim 1, where a third parameter of the three parameter buffer access write method is a status code returned by a computer component providing access to the operation region associated with the SMBus.

11. A system executing components on one or more processors that facilitate access to an SMBus (System Management Bus), comprising:

a computer executable identifier embodied on a computer readable storage medium that identifies an SMBus event notification at a driver; and a computer executable dispatcher in the driver embodied on the computer readable storage medium that directly dispatches the SMBus event notification to a computer executable AML (ACPI Machine Language) event handler, where the AML event handler employs at least one of a three parameter buffer access read method to read data from an operation region associated with the SMBus or a three parameter buffer access write method to write data to an operation region associated with the SMBus, where a first parameter of the three parameter buffer access read method provides an initial data to a computer component providing access to the operation region associated with the SMBus and where a second parameter of the three parameter buffer access read method is a reference to the operation region associated with the SMBus from which the data will be read.

12. A computer implemented method for SMBus (System Management Bus) event handling, the method comprising the following computer executable acts:

receiving an SMBus event notification at a driver;
   identifying the SMBus event notification;
   dispatching the SMBus event notification to an AML (ACPI Machine Language) event handler, where the AML event handler employs at least one of a three parameter buffer access read method to read data from an operation region associated with an SMBus or a three parameter buffer access write method to write data to an operation region associated with the SMBus, where a first parameter of the three parameter buffer access read method provides an initial data to a computer component providing access to the operation region associated with the SMBus and where a second parameter of the three parameter buffer access read method is a reference to the operation region associated with the SMBus from which the data will be read; and handling the SMBus event notification in AML code.

13. The method of claim 12, where the SMBus event notification is identified by examining at least one of a data and a status associated with the SMBus event notification.

14. The method of claim 12, where dispatching the SMBus event notification comprises indexing to a_Qxx control method via a registered AML event handler.

15. The method of claim 12, where handling the SMBus event notification in AML code comprises reading an operation region associated with the SMBus that generated the SMBus notification.

16. The method of claim 15, where the operation region is accessed by a three parameter read, where a first parameter holds an initial data, a second parameter holds a reference to the operation region to be accessed and a third parameter holds data read from the operation region.

17. The method of claim 15, where the operation region is accessed by a three parameter read, where a first parameter holds an initial data, a second parameter holds a reference to the operation region to be accessed and a third parameter holds a reference to data read from the operation region.

18. The method of claim 12, where handling the SMBus event notification in AML code comprises writing an operation region associated with the SMBus that generated the SMBus notification.

19. The method of claim 18, where the operation region is written by a three parameter write, where a first parameter holds a data to be written to the operation region, a second parameter holds a reference to the operation region and a third parameter holds a returned status call.

20. The method of claim 18, where the operation region is written by a three parameter write, where a first parameter holds a reference to a data to be written to the operation region, a second parameter holds a reference to the operation region and a third parameter holds a returned status call.

21. A computer system storing computer instructions operable to perform the method of claim 12.

22. A computer executable system for SMBus (System Management Bus) event handling, comprising:
- means embodied on a computer readable storage medium for receiving an SMBus notification via a_Qxx control method;
- means embodied on the computer readable storage medium for locating an AML (ACPI Machine Language) code event handler associated with the SMBus notification; and
- means embodied on the computer readable storage medium for the_Qxx control method to dispatch the SMB notification to the AML code event handler associated with the SMBus notification, where the AML code event handler employs at least one of a three parameter buffer access read method to read data from an operation region associated with an SMBus or a three parameter buffer access write method to write data to an operation region associated with the SMBus, where a first parameter of the three parameter buffer access read method provides an initial data to a computer component providing access to the operation region associated with the SMBus and where a second parameter of the three parameter buffer access read method is a reference to the operation region associated with the SMBus from which the data will be read.

23. The system of claim 22, comprising means for the AML code event handler to access a data object employed to communicate with the SMBus.

* * * * *